(12) United States Patent
Gang et al.

(10) Patent No.: US 10,396,323 B2
(45) Date of Patent: Aug. 27, 2019

(54) ELECTRICAL BOX FOR BATTERY PACK AND BATTERY PACK STRUCTURE USING SAME

(71) Applicant: LG CHEM, LTD., Seoul (KR)

(72) Inventors: In-Jae Gang, Daejeon (KR);
Bum-Hyun Lee, Daejeon (KR);
Hyeon-Kyu Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/749,815

(22) PCT Filed: Feb. 6, 2017

(86) PCT No.: PCT/KR2017/001305
§ 371 (c)(1),
(2) Date: Feb. 2, 2018

(87) PCT Pub. No.: WO2017/146395
PCT Pub. Date: Aug. 31, 2017

(65) Prior Publication Data
US 2018/0233720 A1 Aug. 16, 2018

(30) Foreign Application Priority Data

Feb. 24, 2016 (KR) ........................ 10-2016-0022041

(51) Int. Cl.
*B60K 1/04* (2019.01)
*H01M 2/10* (2006.01)
(Continued)

(52) U.S. Cl.
CPC ........... *H01M 2/1083* (2013.01); *H01M 2/10* (2013.01); *H01M 2/1094* (2013.01);
(Continued)

(58) Field of Classification Search
CPC ...... B60K 1/00; B60K 1/04; B60K 2001/005; B60K 2001/0405; B60K 2001/0416; B60K 2001/0438; B60L 11/00
See application file for complete search history.

(56) References Cited

U.S. PATENT DOCUMENTS

| 6,184,659 B1 * | 2/2001 | Darmawaskita ...... H02J 7/0052 |
| | | 320/137 |
| 9,246,146 B2 | 1/2016 | Kim et al. |
| | (Continued) | |

FOREIGN PATENT DOCUMENTS

| JP | 54-28030 U | 2/1979 |
| JP | 2010-511278 A | 4/2010 |
| | (Continued) | |

OTHER PUBLICATIONS

International Search Report (PCT/ISA/210) issued in PCT/KR2017/001305, dated May 17, 2017.

*Primary Examiner* — James A Shriver, II
*Assistant Examiner* — James J Triggs
(74) *Attorney, Agent, or Firm* — Birch, Stewart, Kolasch & Birch, LLP (57) ABSTRACT

Provided are an electrical box for a battery pack and a battery pack structure using the same. The electrical box for the battery pack according to an embodiment of the present disclosure is embedded in the battery pack structure in which one or more battery modules are received and includes a battery protection circuit configured to protect the one or more battery modules, and a housing configured to receive the battery protection circuit therein, wherein the housing includes flanges that contact an inner frame constituting a load-bearing structure of the battery pack structure and are configured to support the inner frame, thereby preventing the battery pack structure from being deformed (Continued)

by a load of the battery pack or an external impact and improving the strength and durability of the battery pack structure.

8 Claims, 10 Drawing Sheets

(51) Int. Cl.
 *H01M 10/42* (2006.01)
 *H02J 7/00* (2006.01)
(52) U.S. Cl.
 CPC ......... *H01M 10/42* (2013.01); *H01M 10/425* (2013.01); *H02J 7/0026* (2013.01); *H01M 2220/20* (2013.01)

(56) References Cited

U.S. PATENT DOCUMENTS

| 9,419,261 | B2 | 8/2016 | Kim et al. |
| 2010/0141214 | A1 | 6/2010 | Yoon et al. |
| 2011/0294000 | A1 | 12/2011 | Kim et al. |
| 2012/0171527 | A1* | 7/2012 | Hiroma ................. H01M 2/204 429/61 |
| 2012/0301747 | A1 | 11/2012 | Han et al. |
| 2012/0321927 | A1* | 12/2012 | Loo .......................... B60K 1/04 429/100 |
| 2015/0111083 | A1 | 4/2015 | Kim et al. |
| 2017/0229694 | A1 | 8/2017 | Andersen |

FOREIGN PATENT DOCUMENTS

| JP | 2011-150976 A | 8/2011 |
| KR | 10-2011-0107847 A | 10/2011 |
| KR | 10-1146363 B1 | 5/2012 |
| KR | 10-2014-0126535 A | 10/2014 |
| KR | 10-2014-0128845 A | 11/2014 |
| KR | 10-2014-0137502 A | 12/2014 |
| KR | 10-2015-0014574 A | 2/2015 |
| KR | 10-2015-0042463 A | 4/2015 |
| KR | 10-2015-0113688 A | 10/2015 |

* cited by examiner

ELECTRICAL BOX FOR BATTERY PACK AND BATTERY PACK STRUCTURE USING SAME

TECHNICAL FIELD

The present application claims priority to Korean Patent Application No. 10-2016-0022041 filed on Feb. 24, 2016 in the Republic of Korea, the disclosure of which is incorporated herein by reference.

The present disclosure relates to an electrical box for a battery pack and a battery pack structure using the same, and more particularly, to an electrical box for a battery pack which may prevent the battery pack structure from being deformed by a load of the battery pack or an external impact and may improve the strength and durability of the battery pack structure, and the battery pack structure using the electrical box.

BACKGROUND ART

In general, a second battery refers to a rechargeable battery such as a lithium-ion battery, a lithium-polymer battery, a nickel-cadmium battery, a nickel-hydrogen battery, or a nickel-zinc battery. Recently, as secondary batteries are applied to devices requiring a high output voltage and a high charge capacity such as electric vehicles or hybrid electric vehicles, the secondary batteries are widely used as battery packs. A battery pack is configured to include one or more battery modules each of which includes a plurality of battery cells having an output voltage ranging from about 2.5 V to about 4.2 V and are connected in series or in parallel.

As such, since a battery pack includes a plurality of battery cells or a plurality of battery modules, a battery pack case may be deformed or damaged by a load of the battery pack itself or an external impact when the battery pack is carried or mounted.

Furthermore, as disclosed in Korean Patent Application Publication No. 10-2015-0014574, etc., existing technologies have problems in that since an additional handle is coupled to an outer surface of a battery pack case in order to carry a battery pack, an external structure of the battery pack may be complicated and the battery pack case or the handle may be damaged.

Also, as disclosed in Korean Patent Application Publication No. 10-2014-0137502, etc., existing technologies have problems in that since a handle recessed into a battery pack case is formed in order to carry a battery pack, an external structure of the battery pack may be complicated and inner space utilization may be reduced.

DISCLOSURE

Technical Problem

The present disclosure is designed to solve the problems of the related art, and therefore the present disclosure is directed to providing an electrical box for a battery pack which may prevent a battery pack structure from being deformed by a load of the battery pack or an external impact, improve the strength and durability of the battery pack structure, and facilitate carrying or mounting of the battery pack, and the battery pack structure using the electrical box.

Technical Solution

In one aspect of the present disclosure, there is provided an electrical box for a battery pack, the electrical box embedded in a battery pack structure in which one or more battery modules are received and including: a battery protection circuit configured to protect the one or more battery modules; and a housing configured to receive the battery protection circuit therein, wherein the housing includes flanges that contact an inner frame constituting a load-bearing structure of the battery pack structure and are configured to support the inner frame.

In an embodiment, the flanges may include: a first flange coupled to a top surface of a vertical frame constituting a vertical structure of the internal frame of the battery pack structure; and a second flange extending and bent from the first flange and configured to support a side surface of the vertical frame.

In another aspect of the present disclosure, there is also provided a battery pack structure including: an electrical box including a housing configured to receive a battery protection circuit therein; a receiving case including an inner frame constituting a load-bearing structure and an outer panel supported by the inner frame and configured to receive the electrical box and a battery module protected by the electrical box; and a top cover configured to cover an opening portion of an upper end of the receiving case, wherein the housing of the electrical box includes flanges that contact the inner frame of the receiving case and are configured to support the inner frame.

In an embodiment, the inner frame of the receiving case may include a plurality of vertical frames constituting a vertical structure, wherein the flanges included in the housing of the electrical box include a first flange coupled to a top surface of the vertical frame and a second flange extending and bent from the first flange and configured to support a side surface of the vertical frame.

In an embodiment, the battery pack structure may further include a grip rod coupled to the inner frame of the receiving case in the opening portion of the receiving case.

In an embodiment, the top cover may include a snap-fit coupling portion coupled in a snap-fit manner to the grip rod.

In an embodiment, the top cover may further include a fixed portion fixed to the receiving case and an opening/closing portion having one end pivotably coupled to the fixed portion and configured to open/close the opening portion of the receiving case.

In an embodiment, the snap-fit coupling portion may be located on a bottom surface of the opening/closing portion.

Advantageous Effects

According to the present disclosure, since a flange for supporting an inner frame of a battery pack is provided in a housing of an electrical box provided in the battery pack, the battery pack may be prevented from being physically deformed by a load of the battery pack or an external impact without an additional member and strength and durability may be improved.

Also, since a grip rod is coupled to the inner frame of the battery pack, the battery pack may be easily carried or mounted, an external case structure of the battery pack may be simplified, and space utilization may be improved.

Also, since a coupling portion coupled to the grip rod in a snap-fit manner is provided in a top cover of the battery pack that prevents the grip rod from being exposed to the outside, the top cover may be easily opened/closed and the grip rod may be easily used.

Furthermore, it will become apparent to those skilled in the art from the following description that various embodiments of the present disclosure may solve other unmentioned technical problems.

MODE FOR DISCLOSURE

Hereinafter, embodiments of the present disclosure will be described in detail with reference to the accompanying drawings to clarify a solution to the technical problem of the present disclosure. In the description of the present disclosure, certain detailed explanations of related art are omitted when it is deemed that they may unnecessarily obscure the essence of the present disclosure. Also, terms used herein are defined in consideration of functions in the present disclosure and may be changed according to intentions of designers or manufacturers, or precedents. Accordingly, the terms used herein should be understood based on the whole content of the specification.

Figure 1:
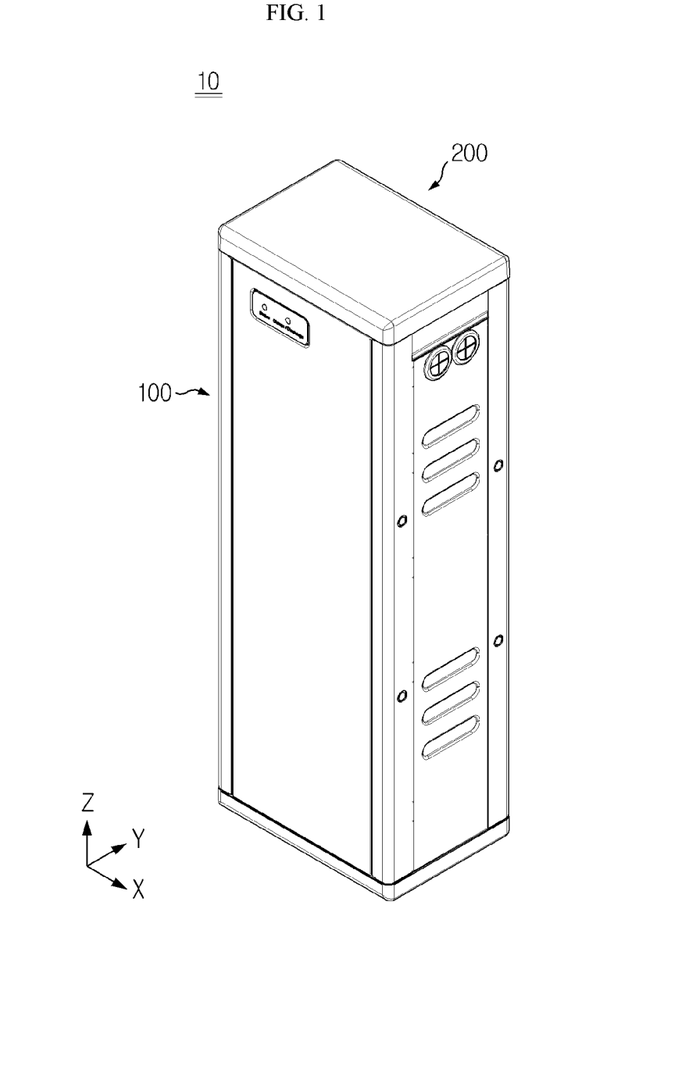
FIG. 1 is a perspective view of a battery pack structure according to an embodiment of the present disclosure.
Figure 2:
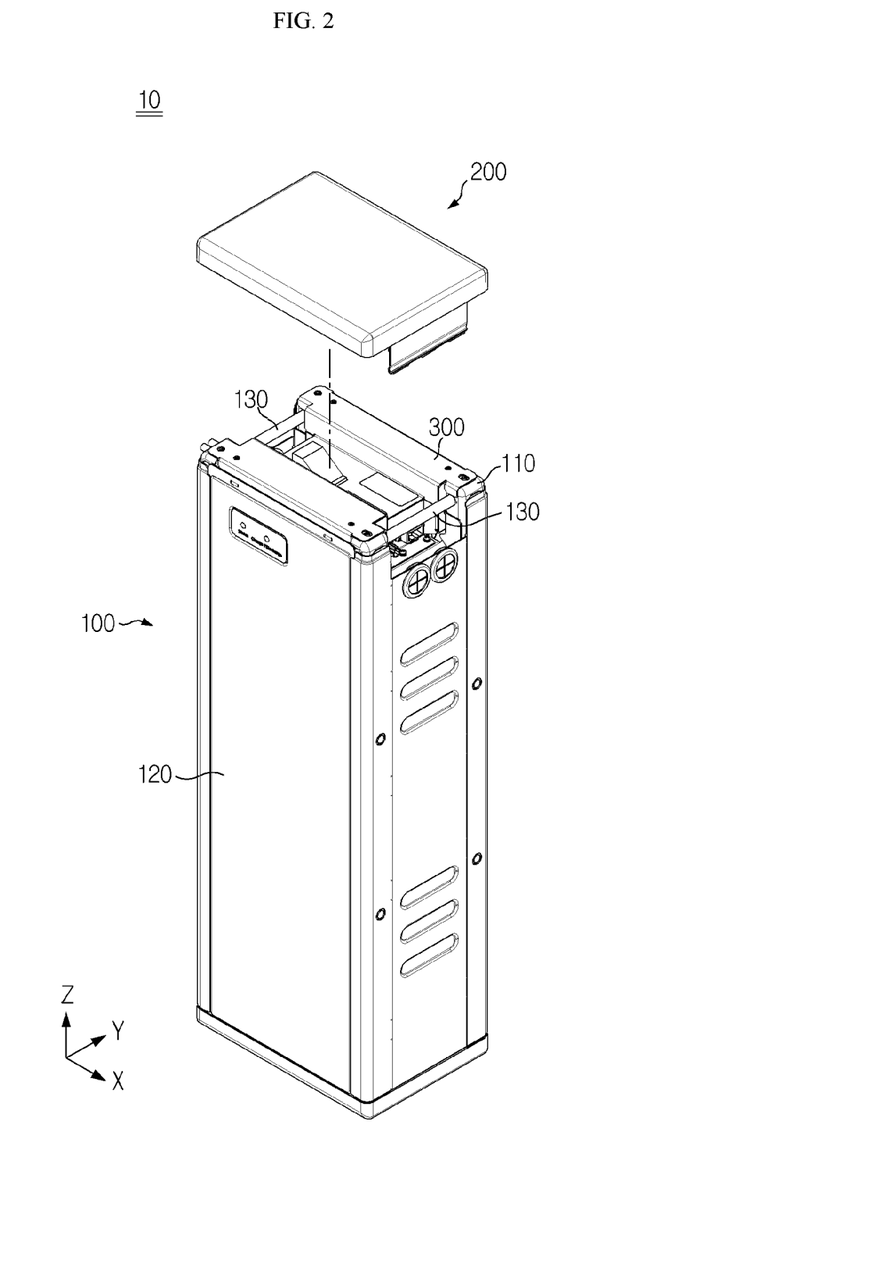
FIG. 2 is a perspective view illustrating a state where a receiving case and a top cover of the battery pack structure of FIG. 1 are separated from each other.
Figure 3:
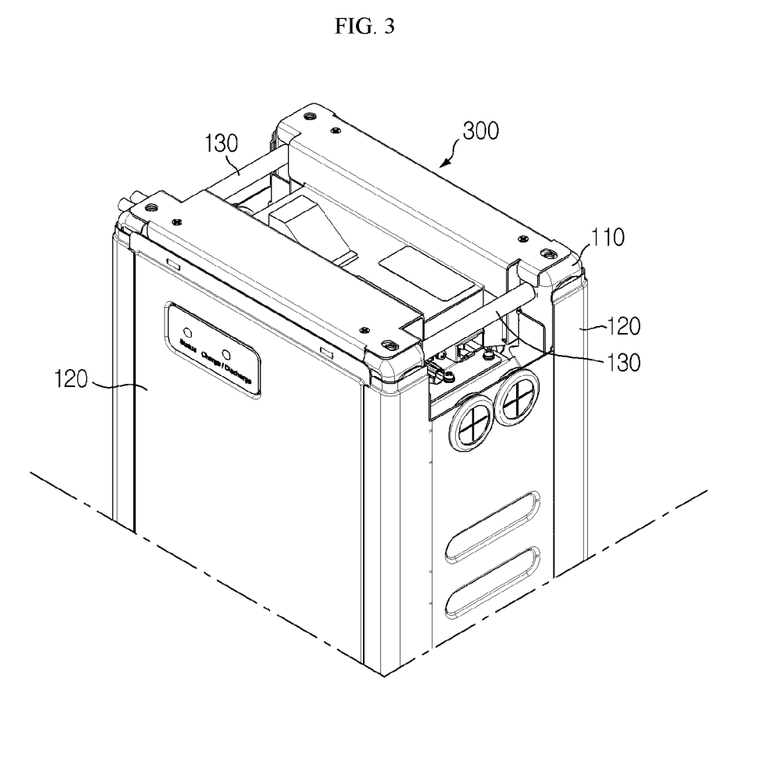
FIG. 3 is an enlarged view illustrating an opening portion of the receiving case of FIG. 2.

FIG. 1 is a perspective view of a battery pack structure 10 according to an embodiment of the present disclosure. FIG. 2 is a perspective view illustrating a state where a receiving case 100 and a top cover 200 of the battery pack structure 10 of FIG. 1 are separated from each other. FIG. 3 is an enlarged view illustrating an opening portion of the receiving case 100 of FIG. 2.

As shown in FIGS. 1 through 3, the battery pack structure 10 according to an embodiment of the present disclosure includes the receiving case 100, the top cover 200, and an electrical box 300.

The receiving case 100 includes an inner frame 110 constituting a load-bearing structure and an outer panel 120 supported by the inner frame 110, and receives, in an inner space, the electrical box 300 and one or more battery modules (not shown) protected by the electrical box 300. In this case, the battery modules may have a stacked structure in which a plurality of battery cells connected in series or in parallel are stacked. Also, the battery pack structure 10 may further include a grip rod 130 coupled to the inner frame 110 of the receiving case 100 in the opening portion of the receiving case 100. As such, since the grip rod 130 is coupled to the inner frame 110 of the battery pack structure 10, the battery pack structure 10 may be easily carried or mounted, an external structure of the battery pack structure 10 may be simplified, and space utilization of the battery pack structure 10 may be improved.

The electrical box 300 protects a battery, for example, by preventing a voltage imbalance between the battery cells constituting the battery modules by performing energy balancing and controlling charging/discharging operations of the battery modules received in the receiving case 100, or by blocking current when overcurrent occurs in the battery modules. To this end, the electrical box 300 may include a battery protection circuit such as a battery management system (BMS) or a current blocking circuit and a housing in which the battery protection circuit is received.

As will be described below, in the present disclosure, the electrical box 300 not only protects the battery modules but also supports the inner frame 110 of the receiving case 100 by using a housing structure, thereby preventing the battery pack structure 10 from being deformed and improving the strength and durability of the battery pack structure 10.

The top cover 200 is coupled to the receiving case 100 and covers the opening portion of an upper end of the receiving case 100. In this case, the top cover 200 may be coupled in a snap-fit manner to the grip rod 130 coupled to the inner frame 110 of the receiving case 100. As such, since the top cover 200 covers the opening portion of the receiving case 100 so that inner elements of the receiving case 100 and the grip rod 130 are prevented from being exposed to the outside, inner elements of the battery pack structure 10 may be protected, impurities may be prevented from being introduced, and the external structure of the battery pack structure 10 may be made compact.

Figure 4:
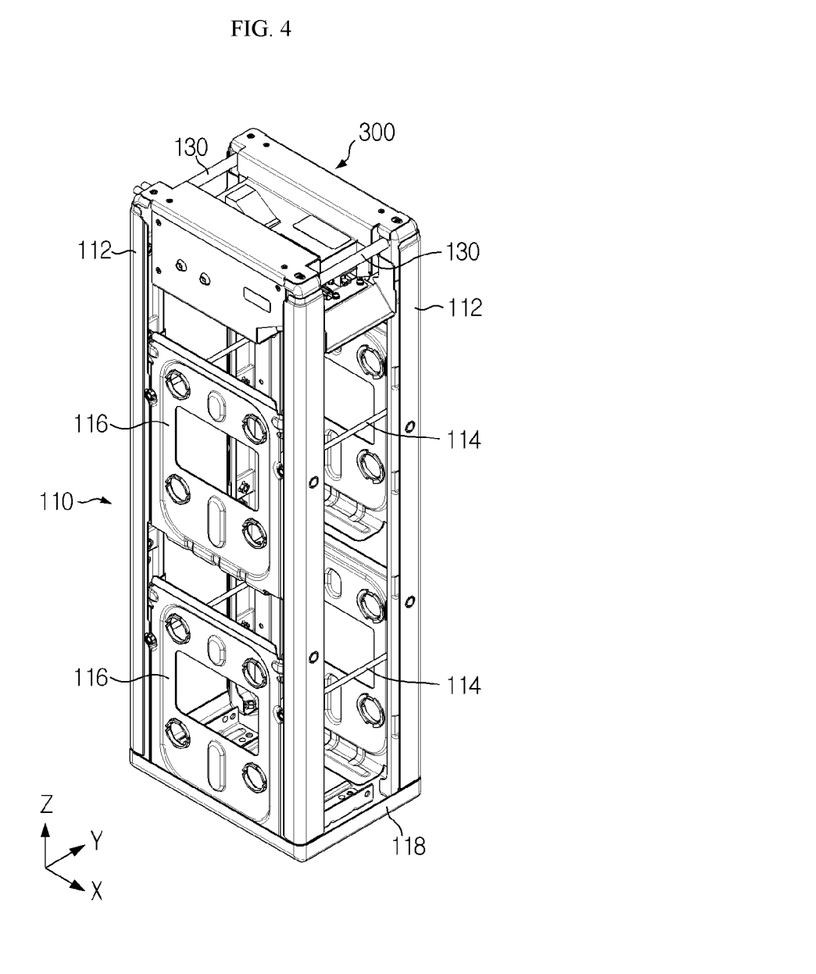
FIG. 4 is a perspective view illustrating an example of a load-bearing structure of the receiving case.

FIG. 4 is a perspective view illustrating an example of a load-bearing structure of the receiving case 100.

As shown in FIG. 4, the load-bearing structure of the receiving case 100 includes the inner frame 110 constituting a basic framework of the receiving case 100, and the electrical box 300 received in an inner space of the inner frame 110 and supporting the inner frame 110 to improve the strength and durability of the battery pack structure 10.

The inner frame 110 may include a plurality of vertical frames 112 constituting a vertical structure and a plurality of horizontal frames supporting the vertical frames 112. In this case, the vertical frames 112 may include four channel beams. The horizontal frames may include long volts 114 each having a rod shape and brackets 116 each having a panel shape. In this case, both ends of the long bolt 114 are coupled to different vertical frames 112 to support the two vertical frames 112. Also, both side ends of the bracket 116 are coupled to different vertical frames 112 to support the two vertical frames 112, and a lower end of the bracket 116 is bent toward the inner space of the inner frame 110 to support one or more battery modules received in the inner space. One pair of grip rods 130 may be coupled to an upper end portion of the inner frame 110, and a lower end cover 118 may be coupled to a lower end portion of the inner frame 110.

The electrical box 300 that is embedded in a battery pack in which one or more battery modules are received is received in the inner space formed by the inner frame 110 of the receiving case 100 and contacts the inner frame 110 to support the inner frame 110.

Figure 5:
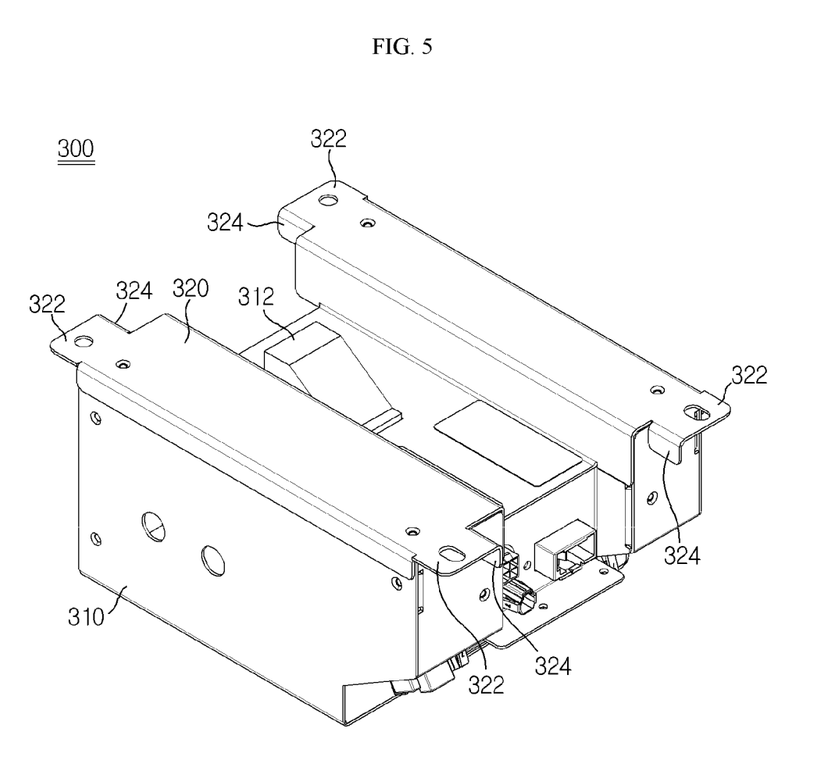
FIG. 5 is a perspective view illustrating an electrical box for a battery pack according to an embodiment of the present disclosure.

FIG. 5 is a perspective view of the electrical box 300 for a battery pack according to an embodiment of the present disclosure.

As shown in FIG. 5, the electrical box 300 includes a battery protection circuit (not shown) such as a BMS or a current blocking circuit and housings for receiving the battery protection circuit. In particular, the housings of the electrical box 300 include first and second flanges 322 and 324 that contact the inner frame 110 constituting a load-bearing structure of the battery pack and support the inner frame 110. The housings of the electrical box 300 may include a lower housing 310 in which various battery protection circuits are received and a fuse holder 312 of a current blocking circuit or the like is located, and an upper housing 320 that is coupled to the lower housing 310 and covers an opening portion of an upper end of the lower housing 310. In this case, the lower housing 310 may have a shape conforming to an inner space formed by the inner frame 110 of the receiving case 100 and may primarily support the inner frame 110. Also, the upper housing 320 may be fixedly coupled to the lower housing 310 and may include the first and second flanges 322 and 324.

Figure 6:
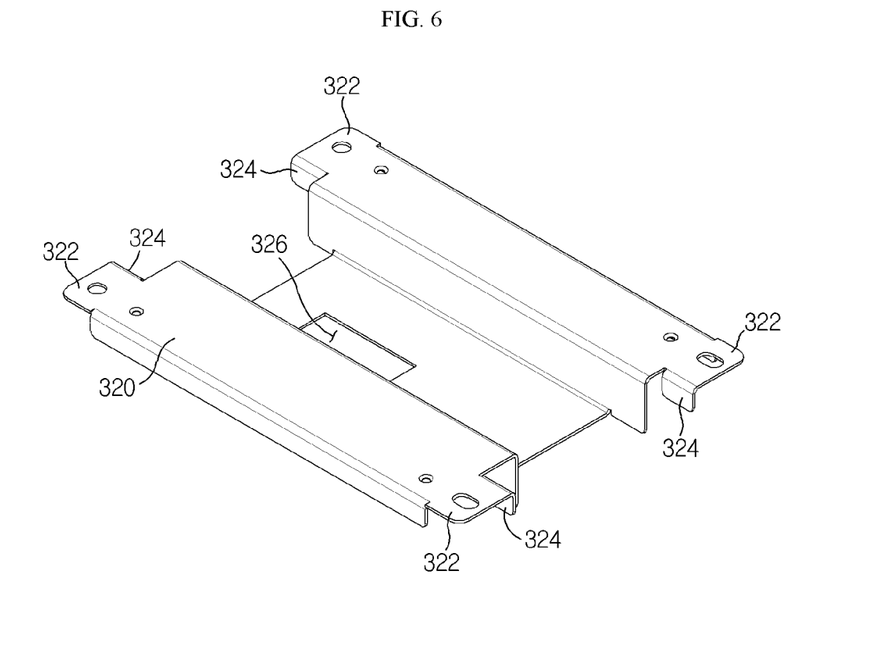
FIG. 6 is a perspective view seen from the top of an upper housing of the electrical box of FIG. 5.
Figure 7:
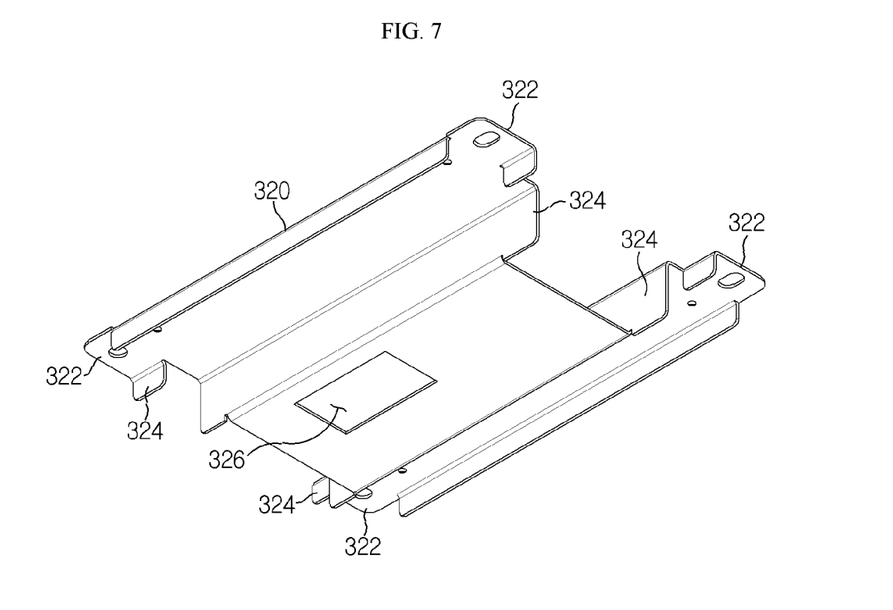
FIG. 7 is a perspective view seen from the bottom of the upper housing of the electrical box of FIG. 5.
Figure 8:
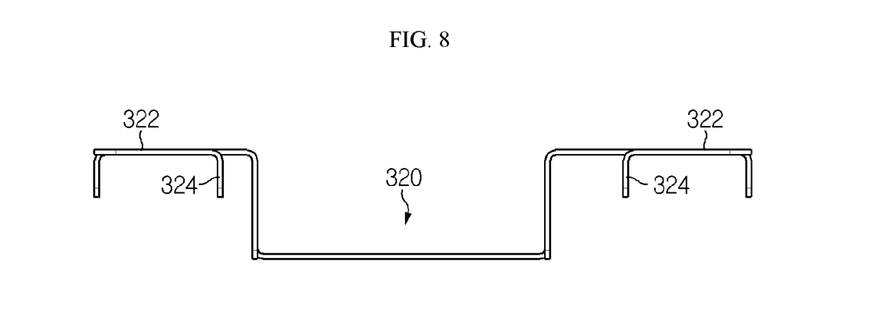
FIG. 8 is a front view of the upper housing of the electrical box of FIG. 5.

FIGS. 6, 7, and 8 are respectively a perspective view seen from the top, a perspective view seen from the bottom, and a front view of the upper housing 320 of the electrical box 300 of FIG. 5.

As shown in FIGS. 6 through 8, the upper housing 320 has a shape conforming to the lower housing 310, and may include the first flange 322, the second flange 324, and a fuse holder insertion hole 326. In this case, the first flange 322 protrudes from a body of the upper housing 320 and is coupled to a top surface of the vertical frame 112 constituting a vertical structure of the inner frame 110 of the battery pack structure 10. In this case, the first flange 322 may be coupled to the top surface of the vertical frame 112 by using a screw or the like. The second flange 324 extends and is bent from the first flange 322, and supports a side surface of the vertical frame 112. A fuse holder 312 located on the lower housing 310 is inserted into the fuse holder insertion hole 326. The fuse holder insertion hole 326 is formed in a stepped portion of the upper housing 320 that is curved downward to easily insert the fuse holder 312 and easily replace a fuse.

As such, since the lower and upper housings 310 and 320 of the electrical box 300 conform to the inner frame 110 of the battery pack structure 10 and include the first and second flanges 322 and 324 that support the vertical frame 112 of the inner frame 110, the battery pack structure 10 may be prevented from being deformed in x, y, and z-axis directions by a total load of a battery pack or an external impact without an additional member, and the strength and durability of the battery pack structure 10 may be improved.

Figure 9:
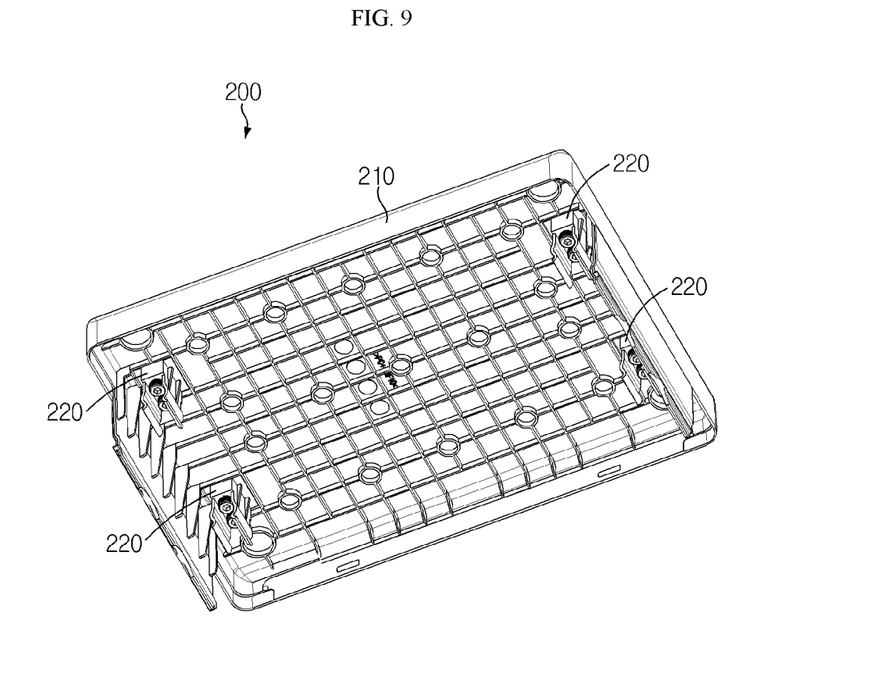
FIG. 9 is a perspective view seen from the bottom of the top cover of FIG. 2.

FIG. 9 is a perspective view seen from the bottom of the top cover 200 of FIG. 2.

As shown in FIG. 9, the top cover 200 may include a body portion 210 and a snap-fit coupling portion 220. The body portion 210 of the top cover 200 basically has a shape conforming to an opening portion of an upper end of the receiving case 100. The snap-fit coupling portion 220 is provided on a bottom surface of the body portion 210, and is coupled in a snap-fit manner to the grip rod 130 provided in the inner frame 110 of the receiving case 100.

Figure 10:
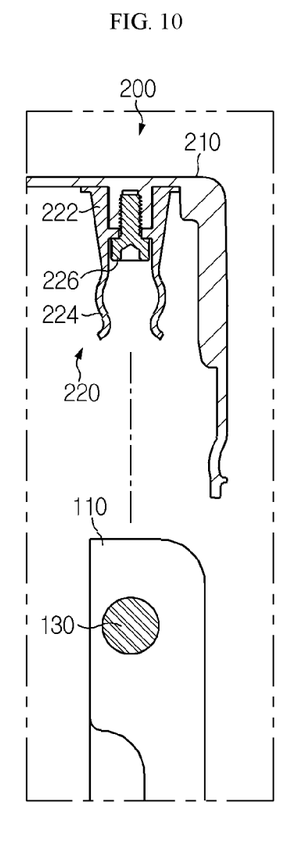
FIGS. 10 and 11 are vertical sectional views illustrating a process of coupling the top cover and a grip rod.
Figure 11:
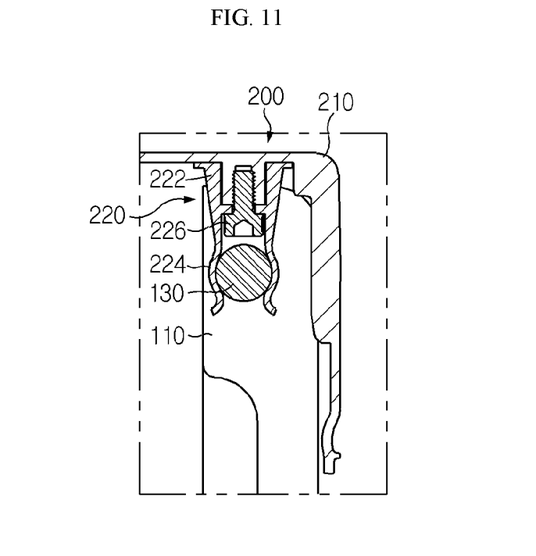

FIGS. 10 and 11 are vertical sectional views illustrating a process of coupling the top cover 200 and the grip rod 130.

As shown in FIGS. 10 and 11, the snap-fit coupling portion 220 may include a fixed portion 222 fixed to the body portion 210 of the top cover 200, one pair of elastic protrusions 224 protruding from the fixed portion 222, and a screw member 226 configured to fix the fixed portion 222 to a bottom surface of the body portion 210. When the top cover 200 is pressed downward to close an opening portion of the receiving case 100, a gap between the one pair of elastic protrusions 224 of the snap-fit coupling portion 220 is widened and thus the grip rod 130 provided in the inner frame 110 of the receiving case 100 is inserted into the gap between the elastic protrusions 224. In contrast, when the top cover 200 is pressed upward in a state where the opening portion of the receiving case 100 is closed, the gap between the one pair of elastic protrusions 224 of the snap-fit coupling portion 220 is widened again and thus the grip rod 130 is separated from the gap between the elastic protrusions 224. To this end, the elastic protrusions 224 of the snap-fit coupling portion 220 may be formed of any of various elastic materials, and may have curved portions having any of various shapes for easy coupling and separation of the grip rod 130.

Figure 12:
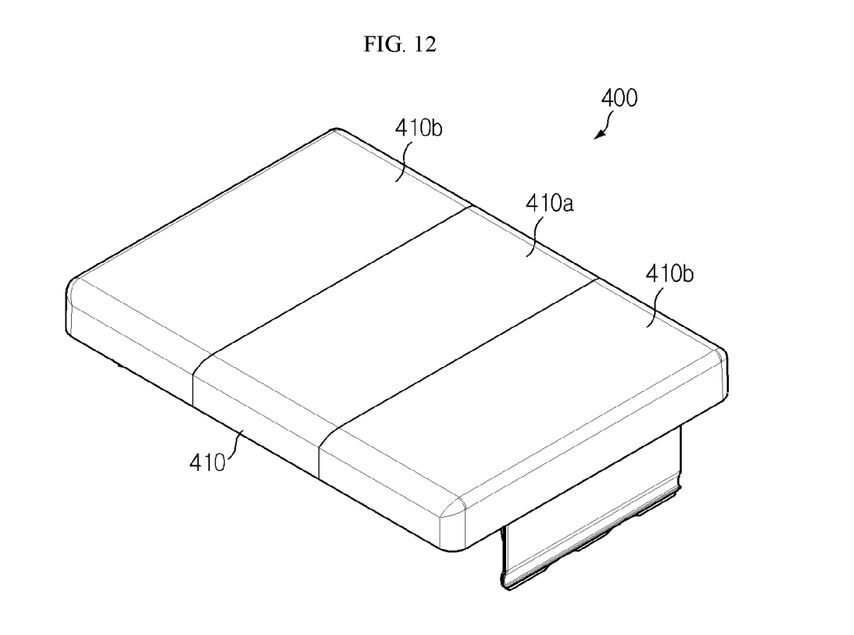
FIG. 12 is a perspective view of a top cover of a battery pack structure according to another embodiment of the present disclosure.
Figure 13:
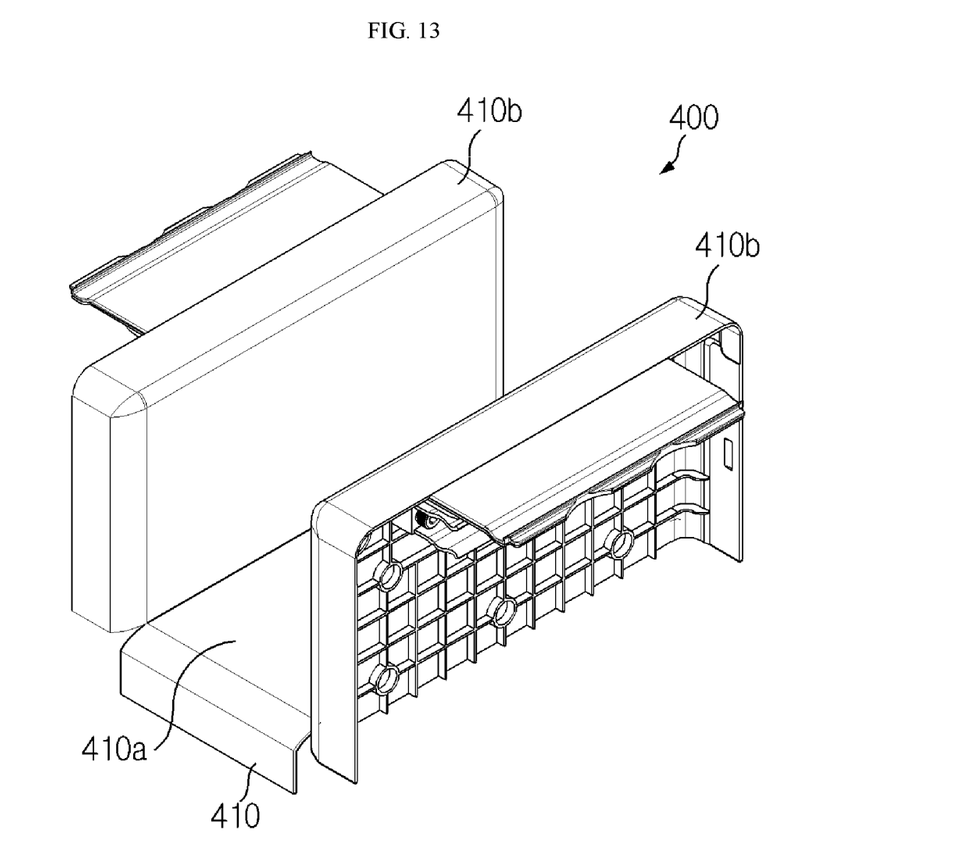
FIG. 13 is a perspective view illustrating a state where an opening/closing portion of top cover of FIG. 12 is opened.

FIG. 12 is a perspective view of a top cover 400 of a battery pack structure according to another embodiment of the present disclosure. FIG. 13 is a perspective view illustrating a state where an opening/closing portion 410b of the top cover of FIG. 12 is opened.

As shown in FIGS. 12 and 13, the top cover 400 of the battery pack structure according to another embodiment of the present disclosure may include a body portion 410 and a snap-fit coupling portion 420. The body portion 410 of the top cover 400 may basically conform to an opening portion of an upper end of the receiving case 100, and may include, in particular, a fixed portion 410a and the opening/closing portion 410b. That is, the fixed portion 410a is fixedly coupled to the opening portion of the receiving case 100. In this case, the fixed portion 410a may be coupled to the receiving case 100 in any of various manners such as a snap-fit manner or by using a screw. One end of the opening/closing portion 410b is pivotably coupled to the fixed portion 410a so that a part of the opening portion of the receiving case 100 that corresponds to the grip rod 130 is opened/closed. In this case, the one end of the opening/closing portion 410b may be coupled to the fixed portion 410a by using a hinge or a pivotable elastic material.

The snap-fit coupling portion 420 may be provided on a bottom surface of the opening/closing portion 410b, and may be coupled to or separated from the grip rod 130 provided in the inner frame 110 of the receiving case 100 in a snap-fit manner as the opening/closing portion 410b is opened/closed. A configuration and an operation of the snap-fit coupling portion 420 may be the same as those of the snap-fit coupling portion 220 described with reference to FIGS. 10 and 11.

Battery pack structures according to various embodiments of the present disclosure may be included in vehicles using power such as electric vehicles or hybrid electric vehicles and may be realized as power supply devices for supplying power in vehicle environments.

As described above, according to the present disclosure, since a flange that supports an inner frame of a battery pack is provided in a housing of an electrical box provided in the battery pack, the battery pack may be prevented from being physically deformed by a load of the battery pack or an external impact without an additional member and the strength and durability of the battery pack may be improved. Also, since a grip rod is coupled to the inner frame of the battery pack, the battery pack may be easily carried or mounted, an external case structure of the battery pack may be simplified, and space utilization may be improved. Also, since a coupling portion coupled in a snap-fit manner to the grip rod is provided in a top cover of the battery pack that prevents the grip rod from being exposed to the outside, the top cover may be easily opened/closed and the grip rod may be easily used. Furthermore, it will be understood by those skilled in the art that various technical problems other than those described herein may also be solved.

While the present disclosure has been particularly shown and described with reference to exemplary embodiments thereof, it will be understood by those skilled in the art that various changes in form and details may be made therein without departing from the scope of the present disclosure as defined by the appended claims. The exemplary embodiments should be considered in descriptive sense only and not for purposes of limitation. Therefore, the scope of the present disclosure is defined not by the detailed description of the present disclosure but by the appended claims, and all differences within the scope will be construed as being included in the present disclosure.

What is claimed is:

1. An electrical box for a battery pack, the electrical box embedded in a battery pack structure in which one or more battery modules are received and comprising:
   a housing configured to receive a battery protection circuit therein,
   wherein the housing comprises a lower housing and an upper housing, the upper housing having a central panel, a vertical wall extending from opposite edges of the central panel and flanges that contact an inner frame constituting a load-bearing structure of the battery pack structure and are configured to support the inner frame,
   wherein the flanges comprise:
   a first flange connected to each vertical wall, the first flange having a first edge connected to a top edge of the respective vertical wall and a second edge spaced from the first edge; and
   a second flange connected to and extending downwardly from a third edge of each first flange, the third edge being between the first edge and the second edge.

2. The electrical box of claim 1,
   wherein the first flange is configured to be coupled to a top surface of a vertical frame constituting a vertical structure of the internal frame of the battery pack structure, and
   wherein the second flange is configured to support a side surface of the vertical frame.

3. A battery pack structure comprising:
   an electrical box comprising a housing configured to receive a battery protection circuit therein;
   a receiving case comprising an inner frame constituting a load-bearing structure and an outer panel supported by the inner frame, and configured to receive the electrical box and a battery module protected by the electrical box; and
   a top cover configured to cover an opening portion of an upper end of the receiving case,
   wherein the housing of the electrical box comprises flanges that contact the inner frame of the receiving case and are configured to support the inner frame,
   wherein the inner frame of the receiving case comprises a plurality of vertical frames constituting a vertical structure, and
   wherein the flanges included in the housing of the electrical box comprise a first flange coupled to a top surface of the vertical frame and a second flange extending and bent from the first flange and configured to support a side surface of the vertical frame.

4. The battery pack structure of claim 3, further comprising a grip rod coupled to the inner frame of the receiving case in the opening portion of the receiving case.

5. The battery pack structure of claim 4, wherein the top cover comprises a snap-fit coupling portion coupled in a snap-fit manner to the grip rod.

6. The battery pack structure of claim 5, wherein the top cover further comprises a fixed portion fixed to the receiving case and an opening/closing portion having one end pivotably coupled to the fixed portion and configured to open/close the opening portion of the receiving case.

7. The battery pack structure of claim 6, wherein the snap-fit coupling portion is located on a bottom surface of the opening/closing portion.

8. A vehicle comprising the battery pack structure of claim 3.

* * * * *